(12) United States Patent
Sagerer-Foric

(10) Patent No.: US 11,976,397 B2
(45) Date of Patent: May 7, 2024

(54) METHOD AND APPARATUS FOR PRECIPITATING SOLVENT OUT OF THE PROCESS AIR IN SPUNBOND PRODUCTION

(71) Applicant: LENZING AKTIENGESELLSCHAFT, Lenzing (AT)

(72) Inventor: Ibrahim Sagerer-Foric, Vöcklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 513 days.

(21) Appl. No.: 17/260,716

(22) PCT Filed: Jul. 17, 2019

(86) PCT No.: PCT/EP2019/069239
§ 371 (c)(1),
(2) Date: Jan. 15, 2021

(87) PCT Pub. No.: WO2020/016296
PCT Pub. Date: Jan. 23, 2020

(65) Prior Publication Data
US 2021/0292949 A1    Sep. 23, 2021

(30) Foreign Application Priority Data

Jul. 17, 2018 (EP) ...................................... 18183887

(51) Int. Cl.
*B01D 37/00* (2006.01)
*D01D 5/096* (2006.01)
(Continued)

(52) U.S. Cl.
CPC ............... *D04H 3/16* (2013.01); *D04H 3/013* (2013.01); *D04H 3/033* (2013.01); *F26B 13/101* (2013.01);
(Continued)

(58) Field of Classification Search
CPC ........ B29C 2791/003; B29C 2791/006; D01D 5/096; D01D 7/00; D01F 2/00;
(Continued)

(56) References Cited

U.S. PATENT DOCUMENTS

| 4,380,570 A | 4/1983 | Schwarz |
| 5,080,569 A | 1/1992 | Gubernick et al. |

(Continued)

FOREIGN PATENT DOCUMENTS

| EP | 1079012 A1 | 2/2001 |
| EP | 1170411 A1 | 1/2002 |

(Continued)

OTHER PUBLICATIONS

International Search Report in counterpart PCT Application No. PCT/EP2019/069239 (5 pages), (dated Oct. 14, 2019).

*Primary Examiner* — Leo B Tentoni
(74) *Attorney, Agent, or Firm* — Venable LLP

(57) ABSTRACT

A device for laying down filaments (3) into a spundbond fabric (8), dehumidifying the spundbond fabric (8) and sucking off the process air loaded with solvents and coagulants, including a conveyor device (7) for transporting the spundbond fabric (8) in a transport direction, wherein the conveyor device (7) has a deposition surface (6) for the filament (3), wherein the conveyor device (7) at least in the region of the deposition surface (6) is permeable for gases and liquids, wherein underneath the deposition surface (6) of the conveyor device (7) there is provided a primary dehumidifying device (9), wherein there is arranged at least one
(Continued)

upper suction device (10, 11) upstream and/or downstream and/or laterally of the deposition surface (6).

12 Claims, 3 Drawing Sheets

(51) Int. Cl.
| | |
|---|---|
| *D01D 7/00* | (2006.01) |
| *D01F 2/00* | (2006.01) |
| *D04H 3/013* | (2012.01) |
| *D04H 3/02* | (2006.01) |
| *D04H 3/03* | (2012.01) |
| *D04H 3/033* | (2012.01) |
| *D04H 3/16* | (2006.01) |
| *F26B 5/04* | (2006.01) |
| *F26B 13/10* | (2006.01) |
| *F26B 13/30* | (2006.01) |

(52) U.S. Cl.
CPC .. *B29C 2791/003* (2013.01); *B29C 2791/006* (2013.01)

(58) Field of Classification Search
CPC ............ D04H 3/013; D04H 3/02; D04H 3/03; D04H 3/16; F26B 13/101; F26B 13/30; F26B 5/04; B01D 37/00
USPC .......... 425/71, 72.2, 86, 377, 382.2; 34/623, 34/658, 406; 264/101, 211.12, 211.14
See application file for complete search history.

(56) References Cited

U.S. PATENT DOCUMENTS

| | | | |
|---|---|---|---|
| 5,695,377 | A | 12/1997 | Triebes et al. |
| 6,306,334 | B1 | 10/2001 | Luo et al. |
| 6,331,268 | B1 | 12/2001 | Kauschke et al. |
| 6,358,461 | B1 | 3/2002 | Law et al. |
| 6,402,492 | B1 | 6/2002 | Achterwinter et al. |
| 7,001,567 | B2 | 2/2006 | Allen et al. |
| 7,004,738 | B2 | 2/2006 | Becker et al. |
| 8,366,988 | B2 | 2/2013 | Chou et al. |
| 9,982,367 | B2 | 5/2018 | Goretzki et al. |
| 2004/0009251 | A1 | 1/2004 | Becker et al. |
| 2005/0023711 | A1* | 2/2005 | Allen ...................... D04H 3/02 264/211.14 |
| 2007/0271749 | A1* | 11/2007 | Noelle .................... D04H 3/16 28/167 |
| 2016/0312384 | A1 | 10/2016 | Goretzki et al. |

FOREIGN PATENT DOCUMENTS

| | | |
|---|---|---|
| EP | 1340844 A1 | 9/2003 |
| EP | 3088585 A1 | 11/2016 |
| GB | 2114052 B | 8/1983 |
| WO | 2006/035458 A1 | 4/2006 |
| WO | 2012/102398 A1 | 8/2012 |
| WO | 2018/071928 A1 | 4/2018 |

* cited by examiner

METHOD AND APPARATUS FOR PRECIPITATING SOLVENT OUT OF THE PROCESS AIR IN SPUNBOND PRODUCTION

The present application is a national-stage entry under 35 U.S.C. § 371 of International Patent Application No. PCT/EP2019/069239, published as WO 2020/016296 A1, filed Jul. 17, 2019, which claims priority to EP 18183887.1, filed Jul. 17, 2018, the entire disclosure of each of which is hereby incorporated by reference.

BACKGROUND OF THE INVENTION

Field of the Invention

The invention relates to a device for laying down filaments into a spunbond fabric, dehumidifying the spundbond fabric and sucking off the process air loaded with solvents and coagulants, including a conveyor device, which has a conveyor belt for transporting spundbond fabric into a transport direction, wherein on the upper side of the conveyor belt there is arranged a deposition surface for the filament, wherein the conveyor device at least in the region of the deposition surface is permeable for gases and liquids, wherein there is provided on the bottom side of the conveyor belt at least underneath the deposition surface a dehumidifying device, wherein above the conveyor belt, next to the deposition surface, there is provided at least one suction device. Furthermore, the invention relates to a method for laying down filaments into a spunbond fabric, dehumidifying the spundbond fabric, sucking off the process air loaded with solvents and coagulants, underneath and above the conveyor belt, separating and recovering the solvent and coagulant from exhaust air.

Background of the Invention

For several decades, spundbond fabrics have been produced according to the spunbond or meltblown method. With the spunbond method, as described, for example, in GB 2 114 052 and EP 3 088 585, filaments are extruded through a nozzle and then pulled off and stretched through a stretching unit situated underneath.

In contrast thereto, in the meltblown method, such as, for example, described in U.S. Pat. Nos. 5,080,569, 4,380,570 and 5,695,377, the extruded filaments are already pulled along and stretched by hot and rapid process air when exiting the nozzle. In both technologies, the filaments are laid down on a deposition surface, for example, a perforated conveyor belt, in an irregular pattern into a nonwoven fabric, transported to the post-processing stages and finally wound into rolls of nonwoven fabrics.

Known suction devices are, for example, described in U.S. Pat. No. 7,001,567, EP 1 079 012, EP 1 340 844 or U.S. Pat. No. 6,331,268.

Methods and devices according to the prior art have been developed mainly for the dispersion of plastic filaments such as, e.g., polypropylene (PP). These filaments are easily movable on the deposition surface and may lead to poor nonwoven fabric forming in the case of bad suction. For this reason, the entire process air is sucked through the deposition surface in order to prevent a reflection of the process air.

Contrary to the already well-known spunbond and meltblown methods for thermoplastic materials, the suction unit for the production of cellulosic spundbond fabrics, for example, made from Lyocell spinning mass, has to find a solution for additional tasks. The production of cellulosic spundbond fabrics using the spunbond technology is, for example, described in U.S. Pat. No. 8,366,988, and using the meltblown technology in U.S. Pat. Nos. 6,358,461 and 6,306,334. Thereby, the Lyocell spinning mass is stretched as in the spunbond and meltblown methods already known, with the filaments, however, being additionally brought in contact with a coagulant before the dispersion of the nonwoven fabric in order to regenerate the cellulose and create form-stable filaments. The wet filaments are laid down as nonwoven fabric in an irregular pattern by way of air turbulence.

As the spinning masses used have cellulose contents of 3 to 17%, there will be required more process air per kg product in cellulosic spundbond fabric technologies than in the production of thermoplastic spundbond fabrics. This will lead to the fact that in the case of equal productivity in comparison to thermoplastic spundbond fabric plants more process air is conveyed through the nozzle and has to be sucked off together with the coagulant and the solvent. More process air will impact at a higher velocity onto the same deposition surface, and this process air is even loaded with a lot of liquid.

As a consequence, the solvent and coagulant, which are present distributed in the waste stream as fine droplets, also have to be discharged. In particular in the production of spundbond fabrics made from Lyocell spinning mass, the loss of the solvent NMMO is to be reduced as much as possible and recovery is to be maximized. This promotes not only the efficiency of the production plant but rather also the fulfilment of official regulations in the field of exhaust air limits.

Due to the increased process air stream in the production of cellulosic spundbond fabrics and the large amounts of solvents and coagulants, which have to be firstly sucked off and then further discharged, the spundbond fabric plants known so far cannot be used, as neither the productivity and the recovery of the solvent required for an economic operation nor the official regulations in regard to purity of exhaust air can be fulfilled.

SHORT DESCRIPTION OF THE INVENTION

In the prior art there is indicated that with the production of cellulosic spundbond fabrics, the process air is sucked off through the deposition surface in order to enable the dispersion of the filaments into a nonwoven fabric. The suction unit thus has to suck off process air as evenly and economically as possible through the deposition surface, without the laid down filaments being shifted by reflected air and any unevenness being developed within the nonwoven fabric. Reflection of process air should be rather prevented.

Due to the differences already described between the preparation of spunbond fabrics from thermoplastic materials and from cellulose, neither the entire amount of process air loaded with solvents and coagulants can be sucked off in an energy-saving nor can it be recovered. In order to meet the increased demands and enable a commercially and environmentally reasonable operation of a spundbond fabric plant for cellulosic spundbond fabrics it is hence the task of the present invention to meet the demands posed for efficiency and environmental protection.

It is the object of the present invention to remove the process air loaded with solvents and coagulants in the production of cellulosic spundbond fabrics as economically as possible, without negatively affecting the nonwoven fabric dispersion.

According to the invention, this task is solved by a device for laying down filaments into spundbond fabric, dehumidifying the spundbond fabric and sucking off the process air loaded with solvents and coagulants, including a conveyor device for transporting the spundbond fabric in a transport direction, wherein the conveyor device has a deposition surface for the filament, wherein the conveyor device at least in the region of the deposition surface is permeable for gases and liquids, wherein underneath the deposition surface of the conveyor device there is provided a primary dehumidifying device, characterized in that there is arranged at least one upper suction device upstream and/or downstream and/or laterally of the deposition surface.

Also in the machine direction the device has at least one upper suction device, which sucks off process air reflected by the deposition surface, upstream or downstream of the deposition surface or laterally next to the deposition surface.

The task is furthermore solved by a method for laying down filaments into a spundbond fabric, dehumidifying the spundbond fabric, sucking off the process air loaded with solvents and/or coagulants, respectively, separating and recovering the coagulant or solvent, respectively, from the process air, wherein filaments are carried out of a spinning system and laid down on a deposition surface of a conveyor device into a spundbond fabric and then further transported, wherein the filaments on the deposition surface are dehumidified from the bottom side of the conveyor device by reducing the pressure, characterized in that process air reflected by the conveyor device is sucked off at least in one section upstream and/or downstream and/or laterally next to the deposition surface above the conveyor device.

In a next step there may be further provided that the coagulant or solvent, respectively, is discharged from the waste stream and recovered.

In one aspect of the invention there is furthermore provided an assembly including a device for preparing cellulosic spundbond fabric and a device of the type mentioned above.

In the following, the device, the method and the assembly are described in parallel in greater detail, with advantageous embodiment variants being discussed.

With the device for laying down filaments into a spundbond fabric, dehumidifying the spundbond fabric and discharging of the process air loaded with solvents and coagulants, the filament, which, e.g., may be derived from a spinning system, is guided onto the deposition surface. In order to regenerate cellulose of the spinning mass filaments extruded from the spinning system into a spundbond fabric, the extrudate is, for example, sprayed with coagulation liquid via nozzles. The now wet spundbond fabric is then laid down on the deposition surface. Simultaneously, the process air required for stretching flows onto the deposition surface. The deposition surface is situated on a conveyor device, which preferably has a conveyor belt for transporting spundbond fabric in a transport direction. On the upper side of the conveyor belt there is now arranged the deposition surface for the filament, wherein the conveyor direction at least in the region of the deposition surface is permeable for gases and liquids. On the bottom side of the conveyor belt there is provided at least underneath the deposition surface a primary dehumidifying device, which, for example, has a vacuum box. Above this section, there is provided at least one upper suction device. According to the invention mainly solvents and coagulants are removed by the primary dehumidifying device, and only as much process air as required for a stable and defect-free nonwoven fabric dispersion. The remaining part of the process air is reflected and collected by at least one suction device above the conveyor device and sucked off. The conveyor device may also be permeable for gases and liquid at least in a region in the machine direction upstream or downstream of the deposition surface. This region may also have a secondary dehumidifying device, using which there are removed, on the one side, also solvents and coagulants from the spundbond fabric and, on the other side, there is held the spundbond fabric such that it is not lifted off the conveyor belt and sucked off by the suction device situated above.

In an embodiment variant there is provided that the upper suction device in operation has a suction direction in the transport direction or opposite to the transport direction or in and opposite to the transport direction towards the deposition surface.

An embodiment variant provides that the upper suction device in operation has a suction direction transversely to the transport direction towards the deposition surface.

Within the scope of the invention there is understood under the notion that the device above this section has at least one upper suction device that process air previously reflected by the deposition surface will be sucked off above the conveyor belt.

Irrespective of the precise embodiment of the upper suction device(s) there is preferably assigned a secondary dehumidifying device underneath the deposition surface to each suction device. In this way, the spundbond fabric is, on the one side, fixed on the conveyor device, and, on the other side, the reflected process air is sucked off.

There is preferably provided that there is arranged a moisture separator or a droplet separator downstream of the dehumidifying devices as well as the suction devices. In this way, solvent or coagulant may be discharged and recovered from the process air and/or the spundbond fabric.

In an embodiment variant there is provided that the upper suction device is arranged in the transport direction of the conveyor device upstream of the deposition surface.

In another embodiment variant there is provided that the upper suction device is arranged in the transport direction of the conveyor device downstream of the deposition surface.

In an embodiment variant there is provided that the upper suction device is arranged in the transport direction of the conveyor device laterally next to the deposition surface.

Especially preferably one upper suction device is arranged in the transport direction upstream of the deposition surface and one upper suction device is arranged in the transport direction downstream of the deposition surface.

Even more preferably one upper suction device is arranged in the transport direction upstream and downstream of the deposition surface and respectively one upper section device is arranged laterally next to the deposition surface.

In a preferred embodiment variant the upper suction devices form a rectangle around the deposition surface, thus sucking off the reflected process air at an angle of 360°.

DETAILED DESCRIPTION OF THE INVENTION

In the present invention there is provided a method, which allows to use the deposition surface mainly for dehumidifying the spundbond fabric and to have the process air reflect from the deposition surface, to suck off the reflected process air and subsequently optionally also separate the solvent and the coagulant and to return back to the coagulation collection tank or to return back to the solvent processing in the consequence thereof, respectively.

The device according to the invention enables dehumidifying the spundbond fabric, reflecting the process air and sucking off the reflected process air next to the deposition surface above the conveyor belt.

In order to better illustrate the invention, the substantial features are depicted in the following figures by way of preferred embodiments of the method according to the invention and the device according to the invention.

FIG. 1 schematically shows a device according to the invention.

Figure 1:
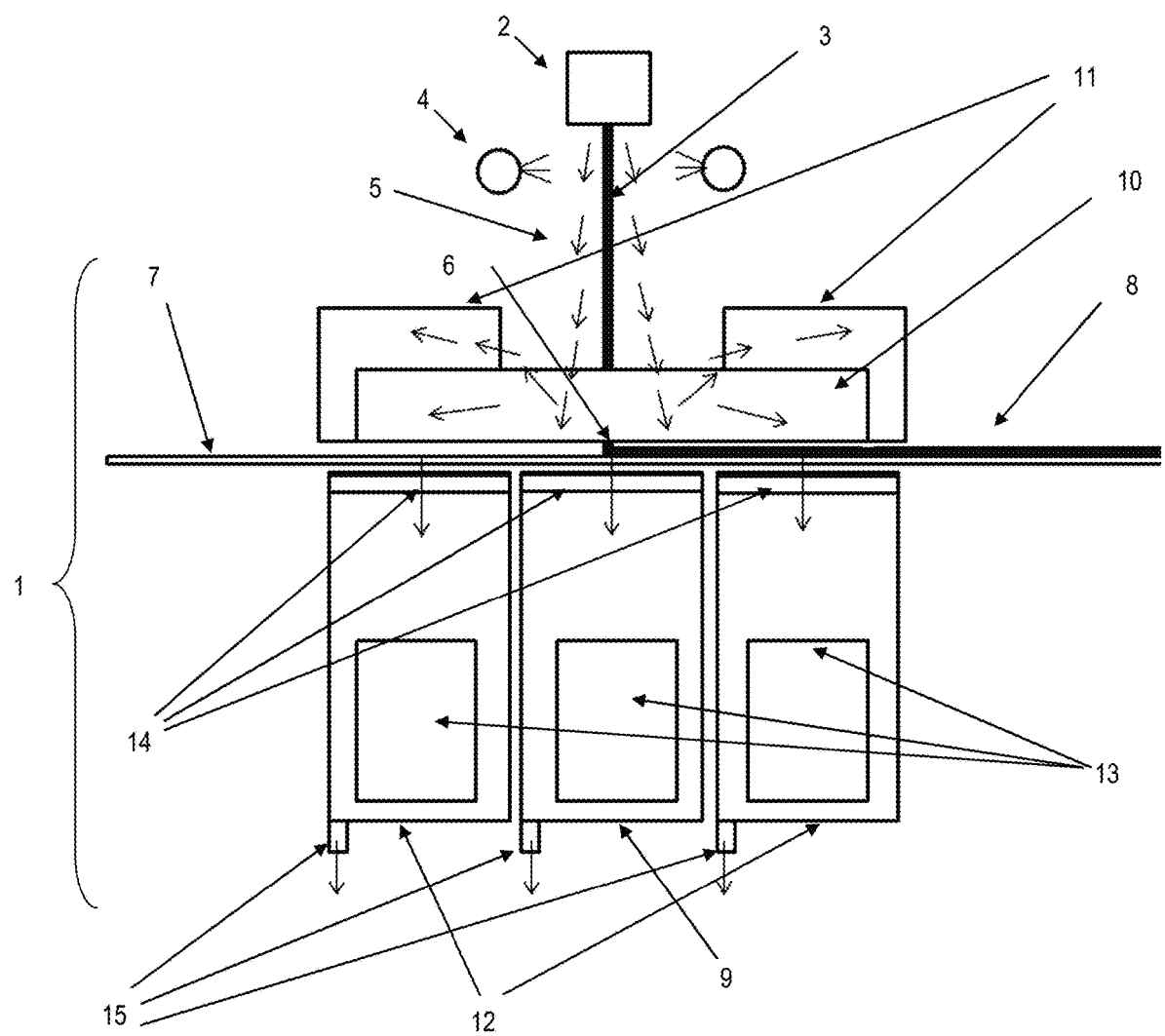
Figure 2:
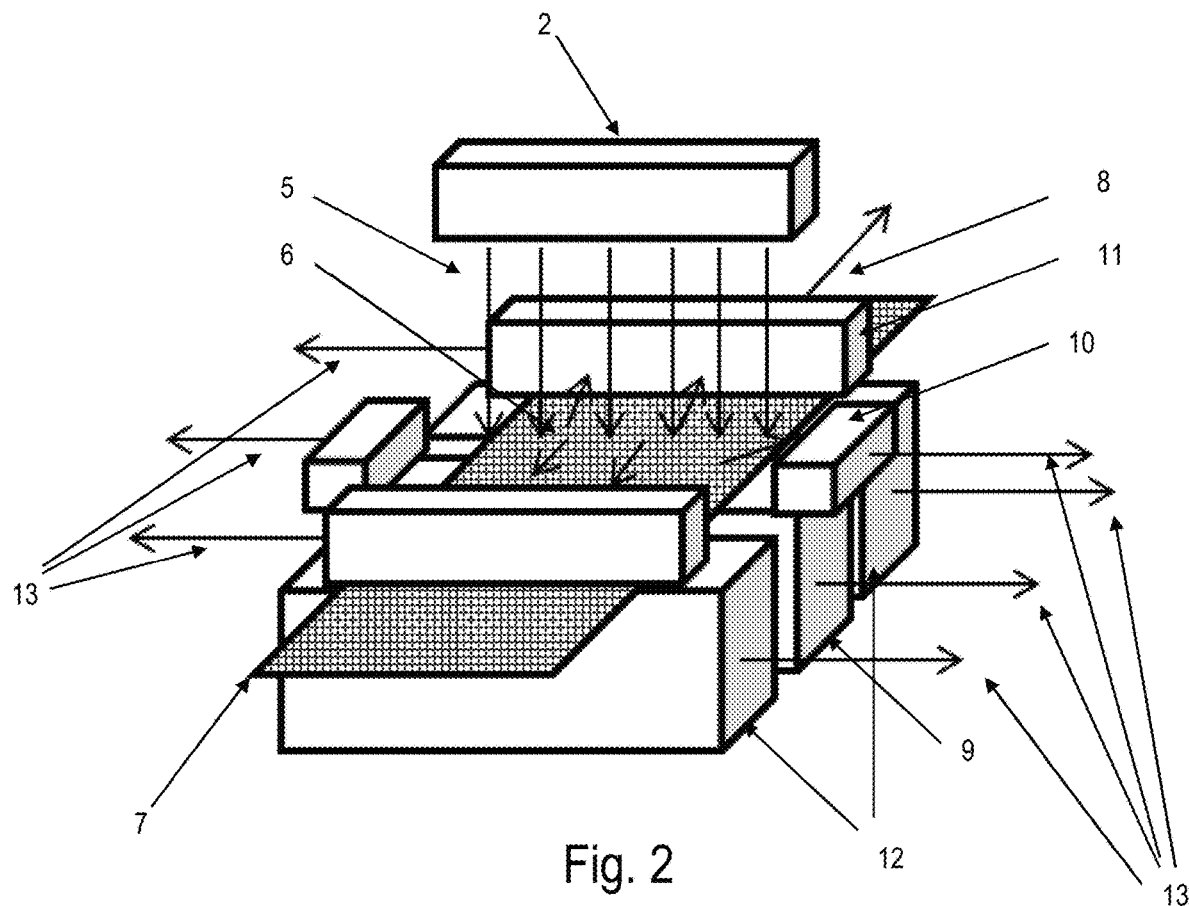
FIG. 2 shows an inclined view of the device according to FIG. 1.
Figure 3:
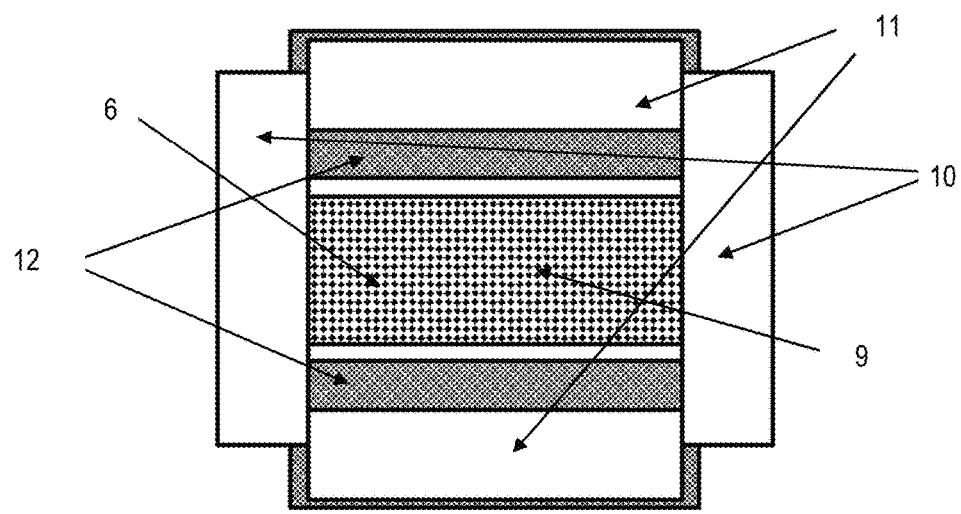
FIG. 3 shows a top view of this device.

FIG. 1 shows the device 1 according to the invention, by means of which the spinning mass filaments 3 extruded and stretched by the spinning system 2 may be laid town into a spundbond fabric 8 and dehumidified. Thereby, the filaments 3 are sprayed with coagulation liquid 4 in order to regenerate the cellulose and stabilize the form of the filaments 3, before the process air 5 and the filaments 3 impact on the deposition surface 6 and the spundbond fabric 8 is being formed.

In the case of the Lyocell process the coagulation liquid may be a mixture of completely desalinated water and NMMO, having a weight percentage of 0% to 40% NMMO, preferably 10% to 30% NMMO, more preferably 15 to 25% NMMO. The spundbond fabric 8 is dehydrated by the deposition surface 6 and the dehumidifying device 9, with the portion of coagulant and solvent in the spundbond fabric 8 being markedly reduced.

It has been shown that with high productivity of the spinning system 2 at between 10 kg/h/m and 1000 kg/h/m flow rate of cellulose, the primary dehumidifying device 9 is already stressed by the large amount of coagulant and solvent such that the amount of process air cannot be completely sucked off as with devices and methods corresponding to prior art and is reflected into all directions upon impact on the deposition surface 6. Surprisingly, however, the cellulosic filaments 3 adhere to the deposition surface 6 that well such that the dispersion of nonwoven fabric is nevertheless possible.

According to the invention, this reflection effect is utilized in so far as the deposition surface 6 mainly serves for removing the mixture of coagulant and solvent from the spundbond fabric 8 by the primary dehumidifying device 9 and reflecting the hot and rapid air stream loaded with coagulant and solvent is being allowed for. One advantage of the device according to the invention is the high conservation of energy, as not the entire amount of process air 5 is sucked off by the primary dehumidifying device 9 at high energy input but may rather be removed above the conveyor device 7 at markedly less pressure loss.

According to the invention, the reflected process air 5 may be captured and sucked off by upper suction devices 11 in the conveyor belt direction (MD boxes) and opposite thereto and by upper suction devices 10 transversely to the conveyor belt direction (CD boxes). In this way, it was possible to prevent that the process air 5 loaded with coagulant and solvent is distributed within the plant space. In this way, not only the solvent could be recovered but also the exhaust air limits could be complied with.

This has given a further advantage of the device according to the invention: As the reflected process air flows at a high velocity into the upper suction devices 10, 11 and the pressure loss is rather low, there will be required only very little energy for the further transport of the process air 5. The suction effect of the upper suction device is that strong that according to the invention there may be used a secondary dehumidifying device 12 in order for the spundbond fabric 8 to be not trailed along into the suction devices 10, 11. In the exemplary embodiment there are shown two secondary dehumidifying devices 12.

Figure 4:
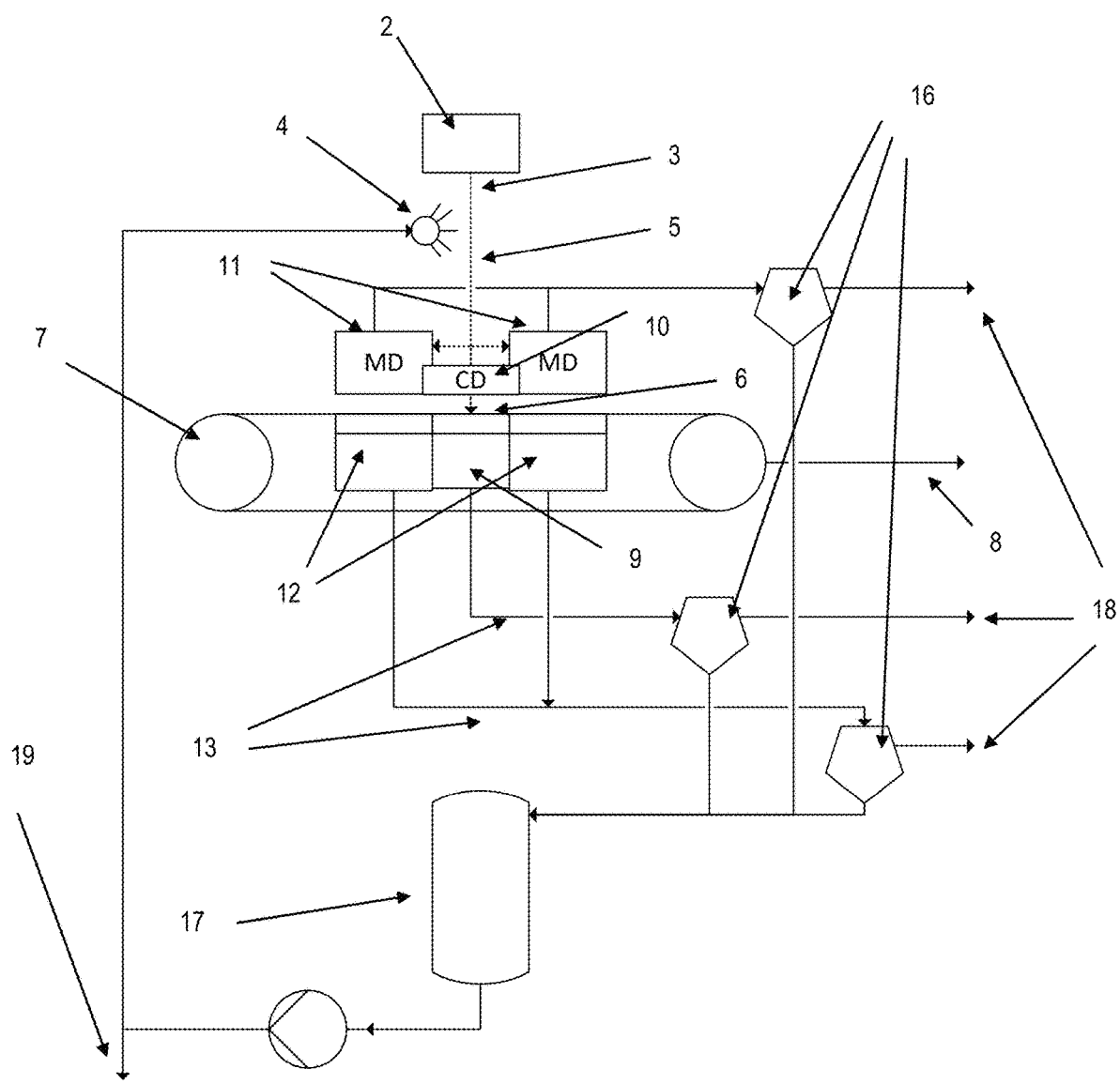
FIG. 4 shows a diagram of an embodiment variant of the invention.

According to the invention a portion of the amount of coagulant and solvent is sucked off from the spundbond fabric 8 via the primary dehumidifying device 9 and the secondary dehumidifying devices 12, and the other portion is sucked off from the reflected process air 5 loaded with coagulant and solvent via the upper suction devices 10, 11. A portion of the amount of coagulant and solvent is separated from the dehumidifying devices 9, 12 via the drainage lines 15, while the droplets of coagulant and solvent are removed from the exhaust air by means of the droplet separator 16. The separated amount of coagulant and solvent may be collected in the coagulation collection tank 17 and may be pumped to the coagulation liquid spray system or conveyed back to solvent processing 19. The solvent cycle, as depicted in FIG. 4, may be closed, and the solvent may be recovered and reused. The exhaust air 18 may be supplied to further cleaning steps downstream of the droplet separators 16.

The economic and environmental advantages are achieved firstly by using the device 1 according to the invention for dehumidifying the spundbond fabric 8 and sucking off process air 5, as the suction performance may be reduced, and secondly by using the inventive method depicted in FIG. 4 for the solvent separation and recovery.

The spundbond fabric 8 is transported on the conveyor belt of the conveyor device 7 either to the next spinning system 2 in order to prepare multi-layered spundbond fabrics, or it is washed, optionally solidified, dried, optionally pre-processed and finally wound into nonwoven fabric rolls.

The method according to the invention may be used for recovering various solvents and ionic liquids, which may be used for the preparation of cellulosic spundbond fabrics, preferably tertiary amino oxides, more preferably NMMO.

The present invention may be used for dehumidifying and sucking off process air in the preparation of cellulosic spundbond fabrics according to the spunbond method and according to the meltblown method. Thereby, the pulp flow rates per spinning system 2 may range from 10 kg/h/m to 1000 kg/h/m, preferably 20 kg/h/m to 500 kg/h/m, more preferably from 30 kg/h/m to 300 kg/h/m. The specific amount of process air per kg pulp may range from 30 $Nm^3$/kg to 1000 $Nm^3$/kg, preferably 50 $Nm^3$/kg to 700 $Nm^3$/kg, more preferably 70 $Nm^3$/kg to 400 $Nm^3$/kg (The unit "$Nm^3$" means "standard cubic metre").

The extruded filaments 3, which are laid down on the deposition surface 6, may have a diameter ranging from 0.1 μm to 100 μm, preferably 1 μm to 40 μm, even more preferably 3 μm to 30 μm.

The specific flow rate of coagulation liquid per kg pulp through the spray system 4 may be ranged from 2 l/kg to 300 l/kg, preferably 10 l/kg to 200 l/kg, more preferably 20 l/kg to 150 l/kg. Therein, the coagulant may be atomized via single-matter nozzles, dual-matter nozzles or other types known to those skilled in the art.

The further the distance between the spinning system 2 and the deposition surface 6 is, the lower is the impact velocity but the higher also is the amount of air that has to be sucked off, as ambiance air has to be pulled in as well. The distance between spinning system 2 and deposition surface 6 may range between 0.1 and 5 m, preferably 0.3 and 4 m, even more preferably between 0.5 and 3 m. The velocity of process air 5 at impact may range between 5 m/s and 250 m/s, preferably between 10 m/s and 150 m/s, even more preferably between 15 m/s and 50 m/s.

The deposition surface 6, for example, forms a woven conveyor belt suitable for dehydration. The conveyor belt 5 rests on vacuum plates 14 and is supported thereby to withstand the dynamic pressure of the process air 5. The vacuum plates 14 may have various forms of holes in order to enhance the effect of dehydration and stabilize the spundbond fabric 8 (not depicted in greater detail). The spundbond fabric 8 that is laid down may have a mass per unit area in the range of 5 g/m² to 500 g/m², preferably 10 g/m² to 300 g/m², more preferably 15 g/m³ to 200 g/m². In the case of a higher mass per unit area, finer filament diameters, large amounts of coagulation liquids, large amounts of process air, small distance between spinning system 2 and deposition surface 6, conveyor belts having low air permeability and several nonwoven fabric layers above one another, more process air 5 is being reflected and collected and sucked off by the suction devices 10, 11.

The major part of the coagulant and solvent is sucked off by the primary dehumidifying devices 9. Thereby, the moisture load of the spundbond fabric 8 is reduced such that the portion of liquid in the spundbond fabric 8 downstream of the dehumidifying devices 9 lies in the range of 0.1 kg/kg to 10 kg/kg, preferably 1 kg/kg to 8 kg/kg, more preferably between 3 kg/kg and 6 kg/kg.

A small part of the amount of coagulant and solvent is also sucked off via the secondary dehumidifying device 12. The solvent accumulates at the primary dehumidifying device 9 as well as at the secondary dehumidifying devices 12 at the lowest point, being discharged via the drainage line 15 to the coagulation collection tank 17.

The major part of process air 5 is reflected and discharged via the suction devices (MD/CD boxes) 10, 11. The MD/CD boxes 10, 11, for example, have specifically formed baffle plates, which provide for the better discharge of the reflected process air (not depicted in greater detail). In-between the MD boxes 11 and the conveyor belt 7, there is existent a gap such that the conveyor belt 7 and the spundbond fabric 8 may be transported there between. The secondary dehumidifying devices 12 are situated underneath the MD boxes 11, holding the spundbond fabric 8.

The primary dehumidifying device 9 and the secondary dehumidifying device 12 may be configured as one apparatus or separate.

The upper suction devices 10, 11 may be configured as one apparatus or separate.

The primary dehumidifying device 9, the secondary dehumidifying device 12 and the suction devices may each be supplied by a distinct suction line 13 having a separator 16 and a vacuum blower or by a common vacuum line. Also other variants there between are possible.

The separators used may, for example, be droplet separators, with also other separation variants being possible.

Several devices according to the invention may positioned one after the other in order to prepare multi-layered spundbond fabrics. Thereby, the first secondary dehumidifying device 12 in the conveyor direction serves for the fixation of the spundbond fabric 8 already laid down such that it will not be damaged by the reflected process air 5 of the next spinning system 2.

In an embodiment variant the conveyor device 7 may have a rotating perforated vacuum drum for dispersing the spundbond fabric, dehumidifying and further transporting it. According to the invention, the reflection effect may then be utilized by a respective adjustment of the suction devices 10, 11 for the removal of process air at the vacuum drum. The rotating vacuum drum may have a deposition surface having a primary dehumidifying device and holding areas for the nonwoven fabric underneath the suction devices having secondary dehumidifying devices (not depicted).

What is claimed is:

1. A device for laying down filaments into a spundbond fabric, dehumidifying the spundbond fabric and sucking off the process air loaded with solvents and coagulants, including a conveyor device for transporting the spundbond fabric in a transport direction,
    wherein the conveyor device has a deposition surface for the filament and at least a region of the deposition surface is permeable to gases and liquids,
    wherein underneath the deposition surface of the conveyor device there is a primary dehumidifying device, and
    wherein at least one upper suction device is arranged at least at one position upstream, downstream or laterally of and proximate to the deposition surface, the at least one upper suction device configured to suck off the process air used in producing the filaments and reflected by the conveyor device.

2. The device according to claim 1, wherein the upper suction device in operation has a suction direction in the transport direction or opposite to the transport direction or in and opposite to the transport direction towards the deposition surface.

3. The device according to claim 1, wherein the upper suction device in operation has a suction direction transversely to the transport direction towards the deposition surface.

4. The device according to claim 1, wherein to each suction device in the machine direction there is assigned a secondary dehumidifying device.

5. The device according to claim 1, wherein the secondary dehumidifying device is operable under vacuum.

6. The device according to claim 1, wherein the upper suction device is arranged in the transport direction upstream of the deposition surface.

7. The device according to claim 1, wherein the upper suction device is arranged in the transport direction downstream of the deposition surface.

8. An assembly comprising a device for producing cellulosic filaments and the device according to claim 1.

9. A method for laying down filaments into a spundbond fabric utilizing the device according to claim 1, comprising:
    dehumidifying the spundbond fabric,
    sucking off the process air loaded with solvents and/or coagulants, respectively,
    separating and recovering the coagulant or solvent, respectively, from the process air, wherein filaments are carried out of a spinning system and laid down on a deposition surface of a conveyor device into a spundbond fabric and then further transported,
    wherein the filaments on the deposition surface are dehumidified from the bottom side of the conveyor device by reducing the pressure, wherein the process air reflected by the conveyor device is sucked off at least in one section upstream, downstream or laterally of and proximate to the deposition surface above the conveyor device.

10. The method according to claim 9, wherein the coagulant or the solvent, respectively, are discharged from the waste stream and then recovered.

11. A device for laying down filaments into a spundbond fabric, dehumidifying the spundbond fabric and sucking off the process air loaded with solvents and coagulants, including a conveyor device for transporting the spundbond fabric in a transport direction, wherein the conveyor device has a deposition surface for the filament, and at least a region of the deposition surface is permeable to gases and liquids, wherein underneath the deposition surface of the conveyor device there is a primary dehumidifying device, and wherein at least one upper suction device is arranged laterally of and proximate to the deposition surface, the at least one upper suction device configured to suck off the process air used in producing the filaments and reflected by the conveyor device.

12. A device for laying down filaments into a spundbond fabric, dehumidifying the spundbond fabric and sucking off the process air loaded with solvents and coagulants, including a conveyor device for transporting the spundbond fabric in a transport direction, wherein the conveyor device has a deposition surface for the filament, and at least a region of the deposition surface is permeable to gases and liquids, wherein underneath the deposition surface of the conveyor device there is a primary dehumidifying device, wherein a first upper suction device is arranged at least at one position upstream of the deposition surface, wherein a second upper suction device is arranged at least at one position downstream of the deposition surface, and wherein the first upper suction device and the second upper suction device are configured to suck off the process air used in producing the filaments and reflected by the conveyor device.

* * * * *